United States Patent
Archard et al.

[11] Patent Number: 6,065,391
[45] Date of Patent: *May 23, 2000

[54] ELECTRONIC CHEF'S FORK

[75] Inventors: Christopher S. Archard, Nashua, N.H.; Patrick Fong Wing Hon, Sunshine City, The Hong Kong Special Administrative Region of the People's Republic of China; So Si Kin, North Point, The Hong Kong Special Administrative Region of the People's Republic of China; Charles Wong Tak Chung, Quarry Bay, The Hong Kong Special Administrative Region of the People's Republic of China; Rudy Woodard, Nashua, N.H.

[73] Assignees: Electronic Tomorrow Limited, Huangham, The Hong Kong Special Administrative Region of the People's Republic of China; Brookstone Company, Inc., Nashua, N.H.

[*] Notice: This patent is subject to a terminal disclaimer.

[21] Appl. No.: 09/373,690

[22] Filed: Aug. 13, 1999

Related U.S. Application Data

[63] Continuation of application No. 09/299,160, Apr. 22, 1999, Pat. No. 5,983,783.

[51] Int. Cl.[7] .............................. A47J 37/00; A47J 43/00
[52] U.S. Cl. ......................... 99/342; 30/34.05; 30/322; 99/419; 99/421 A; 99/493; 374/117; 374/158; 374/155
[58] Field of Search .............................. 99/342–344, 352, 99/419–421, 493, 394; 30/34.05, 43.92, 45, 123, 322, 323; 73/702, 855, DIG. 1; 374/117, 155, 158, 141, 143, 185, 162, 149, 190; 310/361; 264/230; 116/101, 216; 219/384, 506, 712, 734

[56] References Cited

U.S. PATENT DOCUMENTS

| | | | |
|---|---|---|---|
| 3,736,861 | 6/1973 | Kroyer et al. | 99/343 |
| 3,952,597 | 4/1976 | Witonsky et al. | 116/216 X |
| 3,974,696 | 8/1976 | Fitzmayer | 374/155 X |
| 3,975,720 | 8/1976 | Chen et al. | 99/342 |
| 4,083,250 | 4/1978 | Goff et al. | 99/344 X |
| 4,343,185 | 8/1982 | Knute | 374/158 |
| 4,448,546 | 5/1984 | Paros | 374/117 |
| 4,580,025 | 4/1986 | Carlson et al. | . |
| 4,802,370 | 2/1989 | Eernisse et al. | 73/702 X |
| 4,947,278 | 8/1990 | Nichols, III | 30/322 X |
| 4,966,125 | 10/1990 | Stephen et al. | 30/322 |
| 4,969,266 | 11/1990 | Poganitsch | 30/34.05 |
| 5,075,970 | 12/1991 | Albert | 99/322 X |
| 5,273,360 | 12/1993 | Wyatt et al. | 99/342 X |
| 5,983,783 | 11/1999 | Archard et al. | . |

OTHER PUBLICATIONS

Bar–B Check Long–Reach Electronic Thermometer—Advertisement, Fontgate, Holiday 1998.
Bar–B Check Food Thermometer—Adverstisement, Linens 'N Things Catalogue, Jun. 1999.
TruCook Thermofork BBQ Style Instant Read Thermometer—Packaging text, undated.

*Primary Examiner*—Timothy Simone
*Attorney, Agent, or Firm*—Cook, Alex, McFarron, Manzo, Cummings & Mehler, Ltd.

[57] ABSTRACT

An electronic chef's fork is provided which displays indicia such as food type and degree of doneness for a selected food type and temperature and which includes control areas by which the user of the electronic chef's fork selects the meat type. The operational circuitry of the device allows the user to select among an array of food type options and to thereby designate a degree of doneness for the selected type of food. A prompt message is provided to indicate the degree of doneness attained for the selected food type when the device is inserted into the food.

25 Claims, 4 Drawing Sheets

FIG. 1
FIG. 2
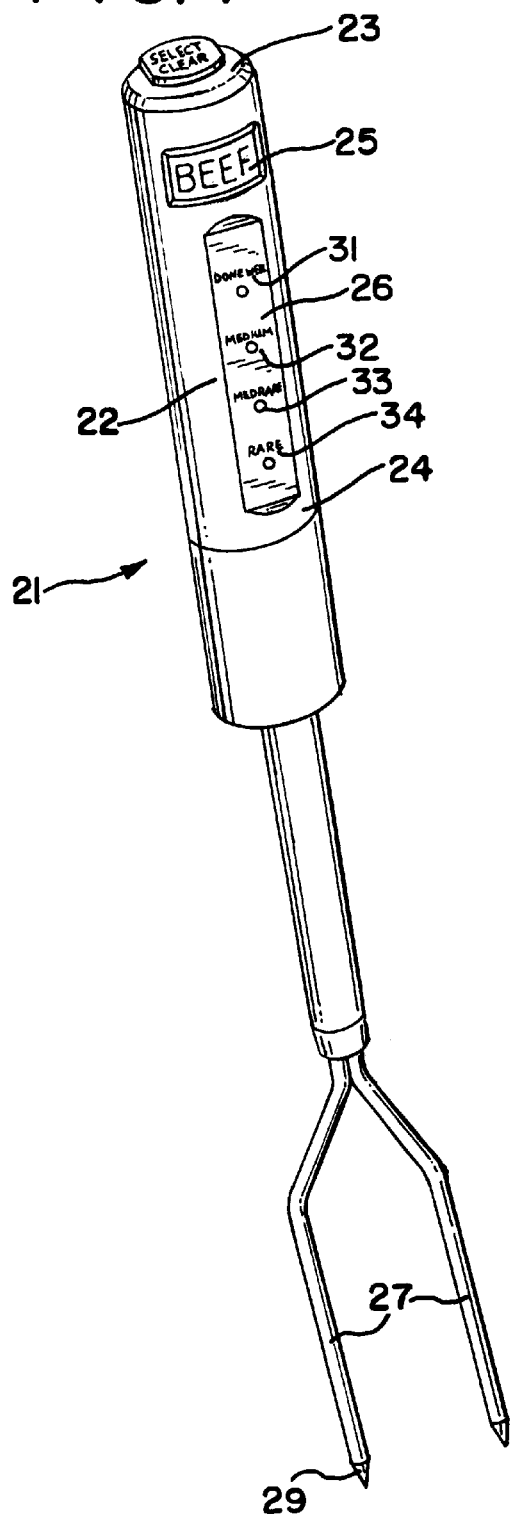
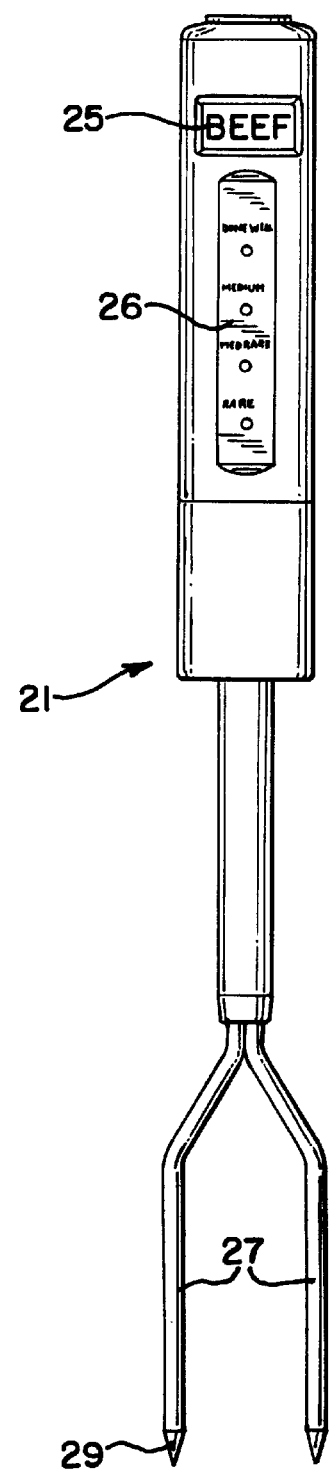

FIG.3 FIG.4 FIG.5
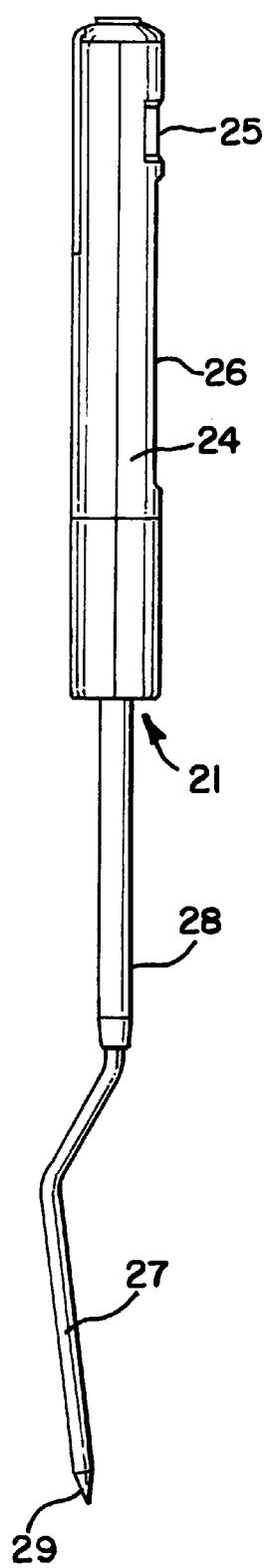
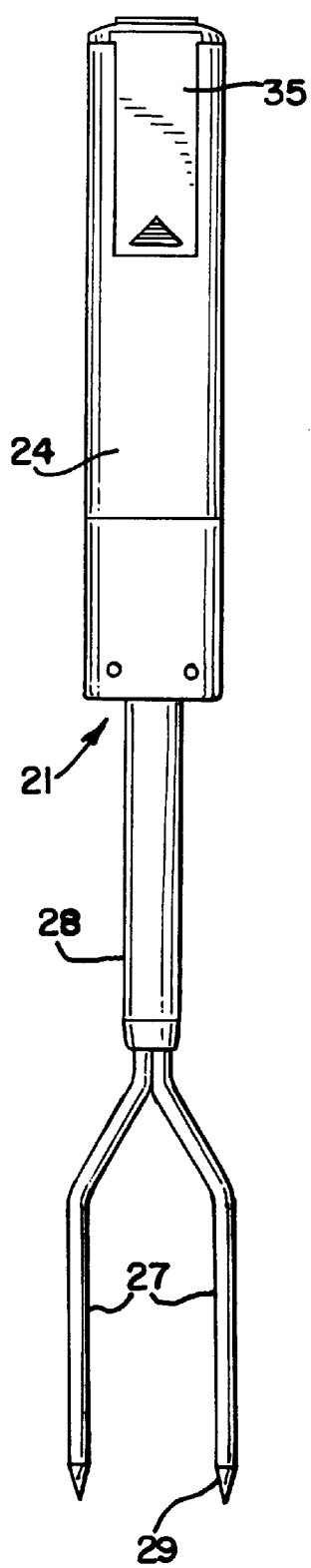
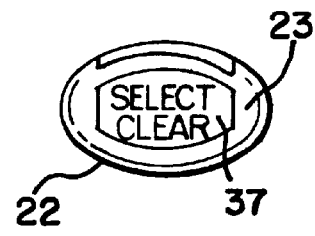
FIG.6
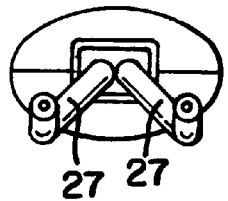

under the control of internal circuitry illustrated in FIGS. 7 and 8. Tines 23, 24 are secured to and extend from the handle housing 22.

ELECTRONIC CHEF'S FORK

This is a continuation of application Ser. No. 09/299,160, filed Apr. 22, 1999, now U.S. Pat. No. 5,983,783.

BACKGROUND AND DESCRIPTION OF THE INVENTION

The invention generally relates to an apparatus and attendant method for determining the extent to which food has been cooked. The invention is designed to indicate when food has been cooked as desired and to prevent overcooking or burning of food products. More particularly, the present invention relates to an improved electronic chef's fork which correlates cooking food internal temperature to the extent that the food has been cooked in accordance with a preselected "doneness" value. A message or signal is emitted by the device so as to inform the user that a degree of doneness has been achieved for a particular selected food or meat.

Various food products are of the type which can be prepared or cooked in accordance with taste preferences of the person or persons expected to consume the food item. This is especially prevalent with respect to meat food items. Typical such items include individual cuts of meat, food in the form of steaks, chops, patties, roasts, rolls, racks, portions, and the like. For some such meat products, a selection often is made from multiple different extents of cooking in order to provide foods having different degrees of "doneness". For example, meats such as beef, veal and lamb are traditionally cooked according to taste preferences, including rare, medium rare, medium, medium well, and well done. With other food products, all of these different varieties of doneness usually are not followed or chosen, whether due to tradition or to a concern or perception that certain foods are to be well-cooked.

In the past, food thermometers have been used for indicating the amount that the food product is cooked, referred to herein as its "doneness". Most of these previous food thermometer devices incorporate a probe which is inserted into the food. The probe is in operative communication with a temperature measuring device. In some prior art units, the user must have inserted the probe into the food item prior to, or in the early stages of cooking, particularly when the food is being cooked in an enclosed oven, grill or the like.

Often, many of the prior units incorporate a food thermometer which provides a direct reading of the temperature of the cooking food at the location of the probe. With this approach, the user must be aware of the significance of the temperature insofar as it correlates to the extent of doneness which is desired or required for a particular type of meat, for example.

Other cooking thermometer devices provide an indicator, such as a pop-up element, when a threshold temperature is reached in accordance with a predetermined extent of doneness. This latter approach can be especially useful for food products which are not cooked according to selected doneness levels, but they achieve an accepted doneness level at a single selected temperature. In general, cooking thermometer devices of this type are not adjustable. In addition, typically no means are provided for informing the user whether the "done" signal had just occurred or had occurred previously. In the latter event, the desired degree of doneness could have been far surpassed by the time the user recognizes that the signal had been given. This can result in burning or overcooking of a food product.

Cooking thermometers which only report the temperature require a knowledgeable user and diligent monitoring of temperature changes. Cooking thermometers which provide only a doneness indication function typically are not adjustable and likewise require careful and diligent attention to avoid overcooking so that cooking can be stopped or reduced promptly after the doneness indicator has become evident.

SUMMARY OF THE INVENTION

In accordance with the present invention, an electronic chef's fork itself indicates doneness in accordance with a selected value within an array of values including differences in food type. Operational circuitry is provided within the chef's fork which digitally receives temperature data from a tine or tines of the fork which are inserted within the food product. The fork itself imparts appropriate signals to provide an indication of doneness for a selected meat type. Inputs by the user activate selection of food type, which selection input will control initiation of the signal to alert the user that the desired degree of doneness has been achieved. If cooking continues at this stage, the device will display doneness signals of a more cooked degree of doneness, rather than indicating only that a first extent of doneness had been obtained.

It is a general object of the present invention to provide an improved electronic chef's fork and method for indicating doneness of a selected food product during the time it is being cooked.

Another object of this invention is to provide an improved digital electronic chef's fork which allows the user to avoid burning or overcooking of foods by providing a signal indicating that the food has been cooked to a certain doneness for that type of food.

Another object of this invention is to provide an improved electronic chef's fork which signals in accordance with programmed cooking particulars, at or after which signal, certain doneness levels can be displayed.

These and other objects, features and advantages of the invention will be clearly understood through a consideration of the following detailed description.

BRIEF DESCRIPTION OF THE DRAWINGS

In the course of this description, reference will be made to the attached drawings, wherein:

FIG. 1 is front perspective view of an embodiment of the electronic chef's fork of the present invention;

FIG. 2 is a front elevational view of the embodiment illustrated in FIG. 1;

FIG. 3 is a left elevational view of the FIG. 1 embodiment;

FIG. 4 is a rear elevational view;

FIG. 5 is a top plan view;

FIG. 6 is a bottom plan view of the FIG. 1 embodiment;.

DESCRIPTION OF THE PARTICULAR EMBODIMENTS

Figure 7:
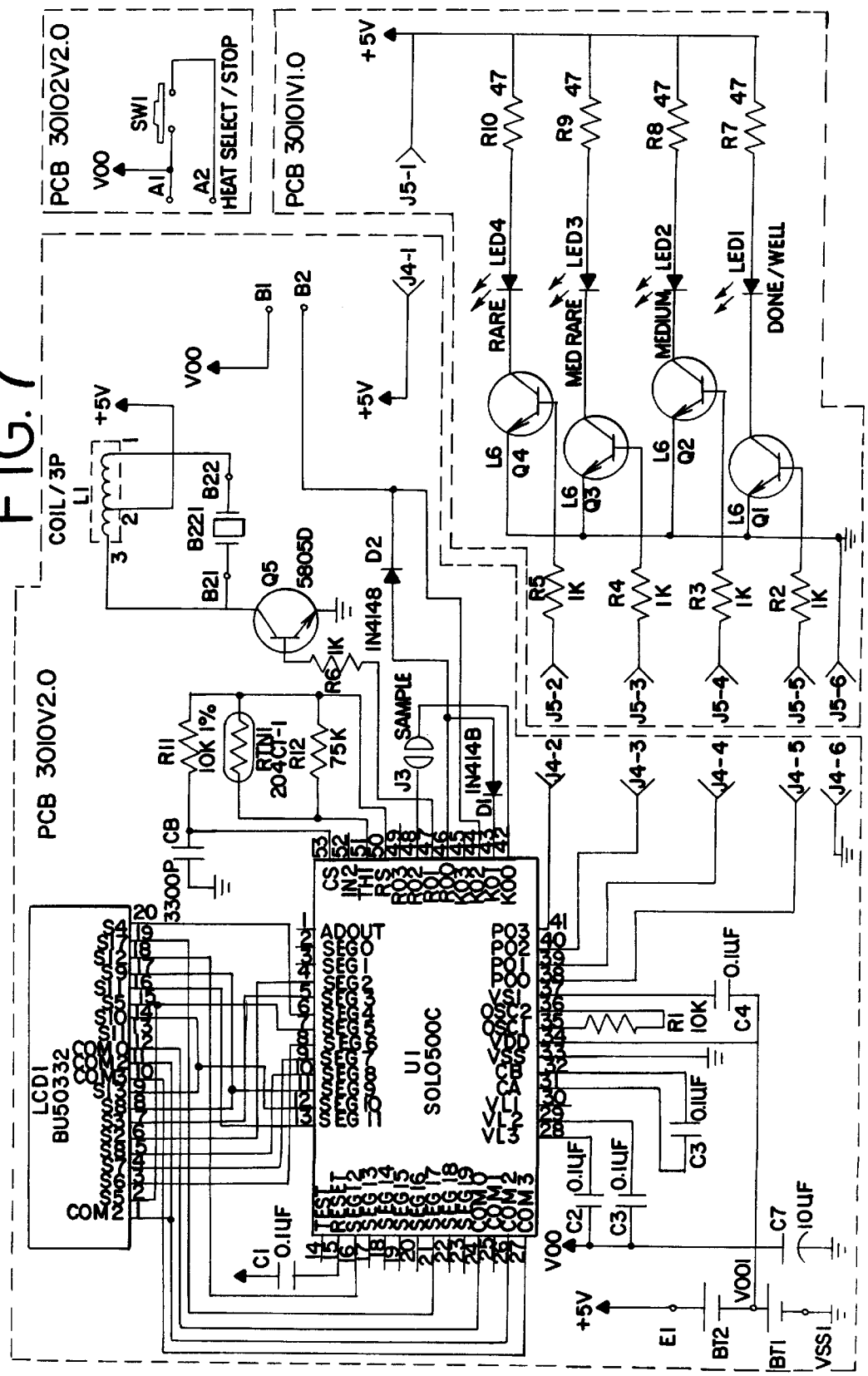
FIG. 7 is a schematic illustration of the operational circuitry of a device in accordance with the present invention.

The illustrated embodiment of the electronic chef's fork or barbecue fork, generally designated at 21 in FIG. 1, includes a handle housing 22 which supports control and display components which are discussed in greater detail hereinafter. Illustrated handle housing has a top portion 23 and a body portion 24. Conveniently, the body portion 24 includes a food selection display panel 25 and a degree of doneness display panel 26, as seen in FIG. 1, FIG. 2 and FIG. 3.

A pair of fork tines 27 are shown in FIG. 1, FIG. 2, FIG. 3, FIG. 4 and FIG. 6. A typical tine is approximately six inches (15 cm) in length and may be constructed of suitable material such as stainless steel. Tines 27 are in electronic communication in a generally known manner with operational circuitry within the housing 22. The latter communication is alone and through sleeve 28 which also provides mounting support for the tines 27. One or both of the tines 27 has a sensor 29, typically at or near a tine tip. Preferably the sensor is a heat sensor. Internal transfer components (not shown), communicate data corresponding to food temperature at sensor 29 to the housing 22 and circuitry associated with it. These data are received by the operational circuitry of the device as input from the sensor when within the cooking food.

Display 25, shown in FIG. 1 and FIG. 2, preferably includes discrete display areas. Typically, these display areas operate in accordance with LCD technology which provides visible indicia that vary as needed. In the illustrated embodiment, display 25 has a word area which has indicia components which spell a word or an abbreviation in order to indicate the type of food or provide some other word indicator. In the illustrated embodiment, word area of display 25 is activated to display one of the following word designations: BEEF; PORK; CHICK; TURKY; VEAL; LAMB. In the preferred embodiment, these word designations appear in the ordered sequence given above upon appropriate manipulation of a component at a control interface. It will be appreciated that this word sequence repeats itself upon continued manipulation. Thus, BEEF follows LAMB, and so forth.

Discrete word areas 31, 32, 33 and 34 also are included within the display 25. One of an array of words is highlighted. The words of the illustrated embodiment are: DONE/WELL; MEDIUM; MED RARE; RARE. In the embodiment shown in the drawings, each wording is associated with a light indicator of a LED type. Other approaches are possible, including having the wordings be within an LCD display or the like. When provided, the light indicators can be of different colors to help readily distinguish among the different wordings.

When the tine sensor is inserted within the meat or the like and when a threshold temperature for that meat or the like is achieved, one of these wordings illuminates or is otherwise made readily visible, and this indicates the extent of cooking doneness which has been achieved. Every doneness option typically need not be provided for all of the food types. This sequence typically is available for each of beef, lamb and veal. For other food selections, such as pork and poultry, only the RARE and the DONE wordings in degree of doneness display panel 26 will be highlighted. Other options are available as desired for particular food products so that at least one of the selected foods will have associated with it the ability to display one or more doneness choices. For example, only the DONE option could be programmed for pork, chicken and/or turkey.

Each doneness option is associated with a selected temperature or temperature range which can be different for each type of meat product of the like. When a given threshold temperature is registered at the sensor embedded within the heated food, the appropriate area or signal will be illuminated or given. In the illustrated embodiment, a light will illuminate. Preferably, the illuminated light will flash to help draw attention to the doneness achieved for the selected meat type.

Reference will now be made to preferred temperature correlations for selected food types and doneness levels. These values typically are programmed into the memory of the operational circuitry. If desired, these temperature values could be modifiable in order to account for personal taste, such as by suitable program features. This preferred arrangement designates a doneness array selection in accordance with Table I.

TABLE I

Doneness Array Selections

| DONENESS | BEEF LAMB | VEAL |
|---|---|---|
| RARE | 140–144° F. | 135–139° F. |
| | 60–62.2° C. | 57.3–59.4° C. |
| MEDIUM RARE | 145–159° F. | 140–154° F. |
| | 62.8–70.6° C. | 60–67.8° C. |
| MEDIUM | 160–169° F. | 155–164° F. |
| | 71.1–76.1° C. | 68.3–73.3° C. |
| WELL | 170° F. and higher | 165° F. and higher |
| | 76.7° C. and higher | 73.9° C. and higher |

Certain food types do not require or typically do not permit selection among as large an array of doneness choices. For these types of products, fewer doneness levels are needed. This is illustrated in this embodiment by a RARE doneness level and by the usually preferred DONE threshold doneness level. For these certain foods, the illustrated circuitry sets this simplified doneness scheme. Table II shows the preferred settings for foods which do not require choice among a full array of doneness selections.

TABLE II

Doneness Selections

| DONENESS | FOOD | TEMPERATURE |
|---|---|---|
| RARE | PORK | 145–174° F. |
| | | 62.8–78.9° C. |
| DONE | PORK | 175° F. and higher |
| | | 79.4° C. and higher |
| RARE | TURKEY | 145–174° F. |
| | | 62.8–78.9° C. |
| DONE | TURKEY | 175° F. and higher |
| | | 79.4° C. and higher |
| RARE | CHICKEN | 145–174° F. |
| | | 62.8–78.9° C. |
| DONE | CHICKEN | 175° F. and higher |
| | | 79.4° C. and higher |

It is generally preferred that no doneness signal or illumination be evident until the RARE threshold is first achieved. Thus, in the case of the illustrated LED system, the LED will remain off at temperatures of 139° F. and below (59.4° C. and below) for beef or lamb, at temperatures of 134° F. and below (56.7° C. and below) for veal, and at temperatures of 144° F. and below (62.2° C. and below) for pork, turkey and chicken.

Specifics concerning operation of the preferred embodiment of the digital electronic chef's fork are now provided. It will be appreciated that details of this operation are illustrated with particularity in FIG. 7 and in FIG. 8. These are to be understood to be in accordance with the illustrated preferred embodiment. Variations in the schematic shown in FIG. 7 and in the flow chart shown in FIG. 8 may be needed in order to accommodate desired operational variations which may be discussed herein or which may be otherwise appropriate within the scope of the invention.

In initiating operation of the illustrated embodiment, a power source such as a typical battery is energized or is placed within the housing 22 through door 35 or any other suitable arrangement. This initiates power to the operational circuitry in accordance with structures and procedures which are generally known. After this power-up phase, the display panel 25 shows a default display of, for example, a food within the word area. The illustrated default displays BEEF. Selection of the food type with which the device is to be used is achieved by activating an appropriate location. In the illustrated embodiment, this location is the SELECT/CLEAR control area 37 located at the top portion 23 of the handle housing. As illustrated, control area 37 is in the form of a button, but other types of control interface areas are suitable, including keys, pads or buttons of any suitable type which will transmit an activation event, such as a touch of the finger, to a signal to the operational circuitry to make the desired change.

In the illustrated embodiment, touching of the SELECT/CLEAR button 37 changes the display in the food selection panel 25, each touch moving the selection from one type to another. Thus, in the illustrated embodiment, activating-the SELECT/CLEAR button 37 will move the display from the default wording BEEF to the next wording in the series, for example PORK. In accordance with the invention, this change in food selection automatically activates the doneness level array or selection which is programmed into the device for the thus selected food. Accordingly, activation of the SELECT/CLEAR button 37 will move from one food selection to the next within the food sequence.

In accordance with the invention, when the tines are properly inserted into the cooking or cooked food, typically the user will be provided with a signal if one of the specified doneness levels has been attained. More particularly, in using the device to determine the degree of doneness, after the food type is selected and noted, preferably the food or meat being cooked is removed from, for example, the grill surface. The prongs 27 with the heat sensor(s) in tip(s) 29 are inserted into the food, preferably at least ½ inch deep into the food, and for at least about 6 to 10 seconds, to allow the tip(s) to heat fully and evenly to facilitate accurate measurement of the temperature of the food. Direct contact of the heat sensor(s) with a bone or with fat should be avoided, so as to avoid inaccuracies caused by such contact. Similarly, probing especially thin portions of the food can result in an improper reading because such portions tend to cook very rapidly.

With the food undergoing heating or cooking, the temperature at the tip sensor(s) 29 rises. In accordance with generally known principles, this temperature rise is transmitted electronically, preferably digitally, to the operational circuitry within the handle housing 22. If this temperature rise is at or above the threshold RARE temperature for the selected food as discussed herein, one of the discrete word areas will be highlighted, such as one of the LED light indicators at discrete word area 31, 32, 33 or 34. This signals the user that the indicated degree of doneness has been achieved for the selected food item. If this corresponds to the degree of doneness desired by the user, the cooking process can be terminated.

Under certain conditions, the user might not respond promptly to terminate cooking. For example, the user may decide that cooking should continue for a short time after an initial doneness indication has been displayed. In order to accommodate such situations, the fork can again be used in order to determine if the additional cooking time has raised the temperature such that a higher temperature doneness level has been attained, or if the food remains within the same doneness level temperature range.

If in fact the food temperature rises so as to enter the next higher range, the LED light or the like for that higher range will illuminate and preferably flash. Typically, the previously illuminated light or the like will cease to be illuminated or flashing. This informs the user of changes in doneness since, for example, a previous reading was taken.

When it is desired to take a second, independent reading of that same food item, or if it is desired to check the doneness level of a different food item, the user can activate the SELECT/CLEAR button 37 once. This will stop the illumination and flashing activities of the illustrated embodiment and clear the circuitry for any such additional measurements.

In the circuitry of the preferred embodiment, a temperature range is provided which is intended to span any needed cooking temperature range. This range of the illustrated embodiment is between 32° F. and 410° F., or between 0° C. and 210° C.

With specific reference to FIG. 7, this discloses digital circuitry of the preferred embodiment which is discussed herein. Such digital circuitry can be embodied in a chip or other suitable carrier. As generally appreciated in the art, the switches depicted tie voltage levels to input pins of the chip. Power can be provided by a suitable battery of 1.5 volts. Two AAA dry cell batteries are usually satisfactory. It will be appreciated that, in this illustrated embodiment, appropriate electrical connections or other electronic communication is provided between the circuitry of FIG. 7 and the display panels 25, 26. Details in this regard will be appreciated by one of ordinary skill in the art.

Figure 8:
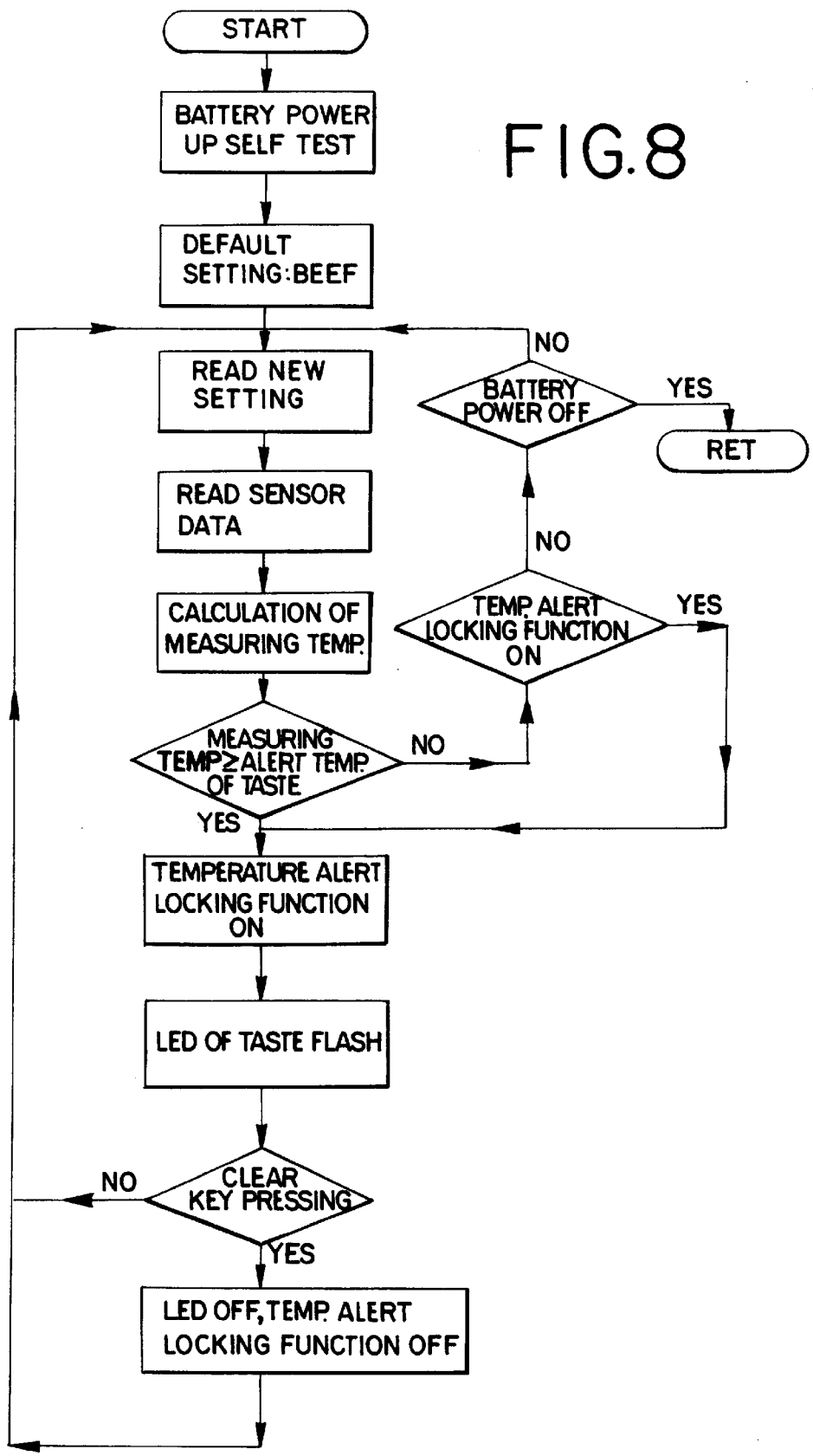
FIG. 8 is a data flow chart incorporating the operational data channel circuitry.

With reference to the flow chart of FIG. 8, details in this respect generally follow those provided herein with respect to the operation of the preferred embodiment. This illustrates a default setting of BEEF for the food selection panel 25. As illustrated in FIG. 8, when the measuring temperature equals or is greater than an alert temperature, this activates flashing of the taste or doneness indicator, illustrated as one of the discrete word areas 31, 32, 33, 34. In the illustrated embodiment this activation temperature is the lower temperature within any of the illustrated ranges within the doneness selections. This activation temperature can be immediately higher on the temperature scale than any of the threshold "off" temperatures discussed above. It will be appreciated that the device could instead be programmed to have the activation temperature correspond generally to a temperature nearer to the middle of any of the ranges of the doneness array selections.

It will be understand that the embodiments of the present invention which have been described are illustrative of some of the applications of the principles of the present invention. Numerous modifications may be made by those skilled in the art without departing from the true spirit and scope of the invention.

What is claimed is:

1. An electronic chef's fork, comprising:
   a handle portion and a tine portion downwardly depending from said handle portion;
   a housing along said handle portion, said housing including operational circuitry;

a display panel associated with said housing and interactive with said operational circuitry;

a control interface area associated with said housing and interactive with said operational circuitry;

a heat sensor of said tine portion, said sensor being in electronic communication with said operational circuitry for monitoring the temperature of a food item;

said operational circuitry selects a food type from an array of food options in response to user interaction with said control interface area;

said operational circuitry designates a degree of doneness for said food type which is selected by way of said operational circuitry; and said operational circuitry further includes a message component associated with said electronic communication of said heat sensor and associated with said food doneness which is designated, said message component initiating a prompt message at said display panel when one of said degrees of doneness is achieved, thereby informing a user that a food item in operative communication with said heat sensor has attained said degree of doneness.

2. The electronic chef's fork in accordance with claim 1, wherein said operational circuitry designates a threshold temperature value which corresponds to the designated degree of doneness for the food type which is selected.

3. The electronic chef's fork in accordance with claim 1, wherein said display panel includes:

a first area for displaying an indicia corresponding to a food type selected in accordance with said operational circuitry; and a second area for displaying an indicia corresponding to a degree of doneness which has been designated in association with said operational circuitry.

4. The electronic chef's fork in accordance with claim 2, wherein said display panel includes:

a first area for displaying an indicia corresponding to a food type selected in accordance with said operational circuitry; and a second area for displaying an indicia corresponding to a degree of doneness which has been designated in association with said operational circuitry.

5. The electronic chef's fork in accordance with claim 1, wherein said operational circuitry designates a degree of doneness for at least one of said food types from among an array of doneness options.

6. The electronic chef's fork in accordance with claim 5, wherein said array of doneness options includes indicia for at least one of rare, medium and well done cooking preferences.

7. The electronic chef's fork in accordance with claim 1, wherein the array of food options of said operational circuitry includes indicia to designate different meat species.

8. The electronic chef's fork in accordance with claim 1, wherein said operational circuitry provides a rare threshold temperature of 140° F. (60° C.) for at least beef; a medium rare threshold temperature of 145° F. (62.8° C.) for at least beef; a medium threshold temperature of 160° F. (71.1° C.) for at least beef, and a well done threshold temperature of 170° F. (76.7° C.) for at least beef.

9. The electronic chef's fork in accordance with claim 8, wherein said operational circuitry further provide an array of degrees of doneness for veal and which are approximately 5° F. (approximately 3° C.) lower than that for beef.

10. The electronic chef's fork in accordance with claim 1, wherein said operational circuitry provides a done threshold temperature for at least pork and for at least poultry.

11. The electronic chef's fork in accordance with claim 8, wherein said operational circuitry further provides a done threshold temperature for at least pork and for at least poultry.

12. The electronic chef's fork in accordance with claim 9, wherein said operational circuitry further provides a done threshold temperature for at least pork and for at least poultry.

13. The electronic chef's fork in accordance with claim 1, wherein said operational circuitry provides a rare threshold temperature and a done threshold temperature for one or more of pork, turkey and chicken.

14. The electronic chef's fork in accordance with claim 1, wherein said heat sensor is at a tip location of said tine portion.

15. An electronic chef's fork, comprising:

a handle portion and a tine portion having a plurality of tines, said tine portion downwardly depending from said handle portion;

a display panel on said handle portion for displaying indicia upon interaction with operational circuitry;

a control interface area on said handle portion for inputting user commands to said operational circuitry;

a heat sensor supported by said tine portion, said heat sensor beingin electronic communication with said operational circuitry for monitoring the temperature of a food item;

said operational circuitry includes food type data for selecting a food type from an array of food options by the activation of commands at said control interface;

said operational circuitry includes food doneness data for designating a degree of doneness from an array of doneness options for at least one of said food types which is selected by commands to the operational circuitry from the control interface area; and said operational circuitry further includes message data in electronic communication with said heat sensor and with said food doneness data, and said message data initiates a prompt message when at least one of said degrees of doneness is achieved, thereby informing a user that a food item in operative communication with said heat sensor has attained said degree of doneness.

16. The electronic chef's fork in accordance with claim 15, wherein said display panel includes:

a first area for displaying an indicia corresponding to a food type selected in accordance with said food type data; and a second area for displaying an indicia corresponding to a degree of doneness which has been designated in association with said food doneness data.

17. The electronic chef's fork in accordance with claim 15, wherein said heat sensor is at a tip location of at least one of said tines.

18. The electronic chef's fork in accordance with claim 15, wherein said food type data and said food doneness data combine to provide a rare threshold temperature and a done threshold temperature for one or more of pork, turkey and chicken.

19. The electronic chef's fork in accordance with claim 18, wherein the array of food options of said food type data includes indicia to designate different meat species.

20. The electronic chef's fork in accordance with claim 15, wherein said array of doneness options includes indicia for at least one of rare, medium and well done cooking preferences.

21. The electronic chef's fork in accordance with claim 15, wherein said food type data and said food doneness data combine to provide a rare threshold temperature of 140° F. (60° C.) for at least beef; a medium rare threshold temperature of 145° F. (62.8° C.) for at least beef; a medium threshold temperature of 160° F. (71.1° C.) for at least beef, and a well done threshold temperature of 170° F. (76.7° C.) for at least beef.

22. The electronic's chef's fork in accordance with claim 21, wherein said food type data and said food doneness data further combine to provide an array of degrees of doneness for veal and which are approximately 5° F. (approximately 3° C.) lower than that for beef.

23. The electronic chef's fork in accordance with claim 15, wherein said food type data and said food doneness data combine to provide a done threshold temperature for at least pork and for at least poultry.

24. The electronic chef's fork in accordance with claim 21, wherein said food type data and said food doneness data combine to provide a done threshold temperature for at least pork and for at least poultry.

25. The electronic chef's fork in accordance with claim 22, wherein said food type data and said food doneness data further combine to provide a done threshold temperature for at least pork and for at least poultry.

* * * * *

UNITED STATES PATENT AND TRADEMARK OFFICE
CERTIFICATE OF CORRECTION

PATENT NO : 6,065,391
DATED : May 23, 2000
INVENTOR(S) : Christopher S. Archard, Patrick Fong Wing Hon, So Si Kin, Charles Wong Tak Chung and Rudy Woodard It is certified that error appears in the above-identified patent and that said Letters Patent are hereby corrected as shown below:

On the Cover Page, under Assignee, "Electronic Tomorrow Limited" should read --Electronics Tomorrow Limited--; under "References Cited, Other Publications", "BBO" should read --BBQ--.
Col. 2, line 46, "FIG.1 is front" should read --FIG. 1 is a front--; line 54, delete the period "." after "embodiment;".
Col. 3, line 65, "product of" should read --product or--.
Col. 5, line 26, "activating-the" should read --activating the--.
Col. 6, line 56, delete "understand" and insert --understood--.
Col. 7, line 62, delete "provide" and insert --provides--.
Col. 8, line 25, "beingin" should read --being in--.
Col. 9, line 7, delete "electronic's" and insert --electronic--.

Signed and Sealed this

Fifteenth Day of May, 2001

NICHOLAS P. GODICI

*Attest:*

*Attesting Officer*   Acting Director of the United States Patent and Trademark Office